Patented May 30, 1944

2,350,082

UNITED STATES PATENT OFFICE 2,350,082

COMPOSITION OF MATTER AND PREPARATION AND PROCESS OF PRODUCING THE SAME

Ilona Taussky, New York, N. Y.

No Drawing. Application April 15, 1942,
Serial No. 439,123

16 Claims. (Cl. 99—92)

My present invention relates to fat containing food compositions, more particularly to cake batter and shortening compositions and to processes of producing the same.

An object of my invention consists in providing improved fat containing food compositions as cake batter and a new improved shortening composition adapted for use particularly in baked flour compositions such as cakes.

Still a further object of my invention consists of various processes for producing the above food compositions.

With the above objects in view, my present invention mainly consists in incorporating various substances produced by treating liquid jojoba nut oil into various compositions and preparations of the type described above.

Liquid jojoba nut oil can be hydrogenated or elaidinated; it is also possible to saponify the liquid, elaidinated or hydrogenated jojoba nut oil and to separate the saponified jojoba nut fatty acids from the unsaponifiable jojoba nut alcohol. In this way, I am able to obtain, in addition to the above mentioned sulphonated, elaidinated and hydrogenated jojoba nut oils, several other jojoba nut oil derivatives, namely saponified unhardened, saponified elaidinated, and saponified hydrogenated jojoba nut fatty acids, and unhardened, elaidinated and hydrogenated jojoba nut alcohols.

It should be stressed that I introduce the above terms in order to simplify the wording and thereby define more clearly the essential parts of the present invention. It should, however, be explained that the term "saponified jojoba nut fatty acids" as used in the following description and claims, means the saponified portion of jojoba nut oil; in the same way the term "saponified unhardened jojoba nut fatty acids" is used for the saponified portion of liquid jojoba nut oil," "saponfiied elaidinated jojoba nut fatty acids" for the saponified portion of elaidinated jojoba nut oil, and "saponified hydrogenated jojoba nut fatty acids" for the saponified portion of hydrogenated jojoba nut oil. It should furthermore be explained that in the following description and claims the expression "jojoba nut alcohol" stands for the unsaponifiable portion of jojoba nut oil; it is therefore also evident that the term "unhardened jojoba nut alcohol" signifies the unsaponifiable portion of liquid jojoba nut oil, the term "elaidinated jojoba nut alcohol" the unsaponifiable portion of elaidinated jojoba nut oil, while "hydrogenated jojoba nut alcohol" means the unsaponifiable portion of hydrogenated jojoba nut oil.

As mentioned above, one of the main objects of the present invention is to provide a new shortening material for baking purposes which has great emulsifying power. Such a shortening material is needed as the regular shortenings, usually made of hydrogenated cotton seed, soy bean or like oils, are substantially lacking emulsifying power. This emulsifying power can be added by using the unsaponifiable distillate of unhardened, elaidinated or hydrogenated jojoba nut oil, i. e. unhardened, elaidinated or hydrogenated jojoba nut alcohol, as shortening material. It should be mentioned that these jojoba nut alcohols can not only be added to a shortening but also admixed to a cake batter or to other food products, if desired.

Preferably, the jojoba nut alcohol is not used as the sole shortening ingredient in the cake batter but forms only about 1% to 20% of the ingredients added to the batter. Thus, a preferred shortening composition according to my present invention consists mainly of a hydrogenated vegetable oil of the type used up to now for shortening purposes and of about 1% to 20%, preferably between 5% to 10%, of untreated, elaidinated or hydrogenated jojoba nut alcohol. If hydrogenated jojoba nut alcohol has to be one of the ingredients of the shortening composition, this composition can be produced either by mixing the finished hydrogenated usual vegetable oil shortening with the finished hydrogenated jojoba nut alcohol or by intimately mixing the not hydrogenated compounds and subjecting them to the process of hydrogenation after mixing.

Shortening compositions of the type described above may be produced in various ways. Thus, for instance, it is possible to produce a shortening by mixing unhardened, elaidinated or hydrogenated jojoba nut alcohol prepared as previously described with normal hydrogenated cotton seed oil which is used as a regular shortening. The jojoba nut alcohol should be about 1% to 20%, preferably 5% to 10% of the shortening composition. After mixing, this shortening composition is deodorized, first under vacuum and then with dry or superheated steam at a temperature of about 350 to 400 degrees F. After cooling and chilling, the finished shortening composition has an excellent stability towards oxidation and results in a batter without curdling when used for baking purposes. Cakes baked with such a shortening composition have a fair volume and fine texture.

Another way of producing shortenings consists in mixing about 5% to 10% of liquid jojoba nut alcohol with about 95% to 90% of cotton seed or soy bean oil and hydrogenating this mixture. The hydrogenated product serving as shortening after cleaning and deodorizing has an excellent stability toward rancidity and oxidation. All shortening compositions produced as described above are very well adapted not only for baking but also for frying purposes.

It will be understood that each of the elements described above, or two or more together, may also find a useful application in other types of compositions and preparations differing from the types described above.

While I have illustrated and described the invention as embodied in certain compositions and preparations, I do not intend to be limited to the details shown, since various modifications and structural changes may be made without departing in any way from the spirit of my invention.

What I claim as new and desire to secure by Letters Patent is:

1. A fat containing food composition having incorporated therein a proportion of at least one substance selected from the group consisting of unhardened jojoba nut alcohol, elaidinated jojoba nut alcohol, and hydrogenated jojoba nut alcohol.

2. A cake batter emulsion having included therein a proportion of at least one substance selected from the group consisting of unhardened jojoba nut alcohol, elaidinated jojoba nut alcohol, and hydrogenated jojoba nut alcohol.

3. Shortening composition containing about 1% to 20% of jojoba nut alcohol.

4. A shortening composition containing a hydrogenated mixture of jojoba nut alcohol and at least one vegetable oil.

5. Shortening consisting mainly of a hydrogenated vegetable oil having low emulsifying power and of about 1% to 20% of jojoba nut alcohol.

6. A cake batter emulsion having included therein a proportion of elaidinated hydrogenated jojoba nut alcohol.

7. A fat containing food composition with increased stability against rancidity having incorporated therein a proportion of jojoba nut oil the saponifiable ingredients of which are at least partly removed.

8. A fat containing food composition with increased stability against rancidity having incorporated therein a proportion of jojoba nut oil without the saponifiable ingredients thereof.

9. A cake batter emulsion having incorporated therein a small percentage of jojoba nut oil the saponifiable ingredients of which are at least partly removed.

10. A cake batter emulsion having incorporated therein a small percentage of jojoba nut oil without the saponifiable ingredients thereof.

11. Method of increasing the emulsifying power of a fat containing food composition comprising incorporating theren a small proportion of jojoba nut oil.

12. Method of increasing the emulsifying power of a fat containing food composition comprising treating jojoba nut oil so as to remove at least substantially the saponifiable ingredients of said jojoba nut oil and incorporating the thus treated oil into said fat containing food composition.

13. Method of increasing the emulsifying power of a fat containing food composition comprising the step of incorporating jojoba nut alcohol into said fat containing food composition.

14. Method of producing an improved shortening comprising incorporating therein a small proportion of jojoba nut oil.

15. Method of producing an improved shortening comprising treating jojoba nut oil so as to remove at least substantially the saponifiable ingredients of said jojoba nut oil and incorporating the thus treated oil into said shortening.

16. Method of producing an improved shortening comprising the step of incorporating jojoba nut alcohol into said shortening.

ILONA TAUSSKY.